United States Patent Office 2,890,222
Patented June 9, 1959

2,890,222
QUATERNIZED NICOTINIUM DERIVATIVES

George M. Omietanski, Tonawanda, N.Y., assignor to The Ohio State University Research Foundation, Columbus, Ohio No Drawing. Application March 14, 1958
Serial No. 721,333

6 Claims. (Cl. 260—291)

This invention relates to derivatives of nicotine. In one specific aspect, it relates to a new class of quaternized nitrogen compounds, the 1-aminonicotinium salts.

Nicotine is well known as the major alkaloid of the tobacco plant and is a high boiling, water-soluble liquid which turns brown on exposure to air. Extremely dilute aqueous solutions, down to 1 part in $10^5$, are readily detected by means of the characteristic picrate.

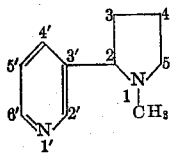

As shown in the structural formula, nicotine is 2-(3-pyridyl)-1-methylpyrrolidine, a weak base because of the two tertiary amines present in the molecule. The pyrrolidine nitrogen reacts like an aliphatic tertiary amine while the other nitrogen is part of an aromatic ring system (pyridine) and exhibits markedly different behavior. As expected, salts of nicotine are readily converted back to the free base on treatment with aqueous sodium hydroxide. Naturally occurring nicotine is levorotatory (carbon 2 of the pyrrolidine ring is asymmetric); but a discussion of stereoisomeric possibilities is not required for a proper understanding of this invention.

It has been discovered recently that chloramine and hydroxylamine-o-sulfonic acid react with trisubstituted tertiary amines to give the corresponding trisubstituted hydrazinium chlorides and sulfates (or bisulfates) respectively. The bisulfate product from nicotine and hydroxylamine-o-sulfonic acid, for example, may be formulated in either of two equivalent ways.

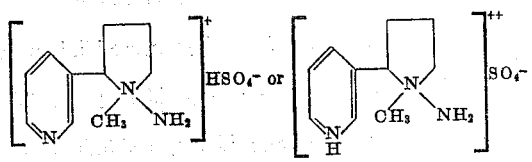

Although there is interaction between the proton and the pyridine ring, for convenience, the first formulation is preferred. This representation is more satisfactory because it begs the question as to the degree and mode of interaction, an important consideration with weaker polyprotic acids. At the same time it lessens the possibility of confusion by making the distinction between bisulfate and sulfate more apparent as shown below. Similar considerations hold for other polyprotci acids.

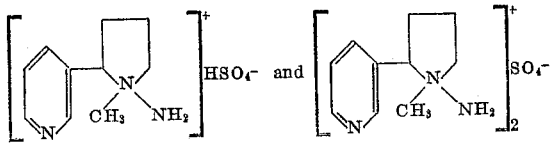

It is therefore an object of the present invention to provide a new generic class of nicotine derivatives, useful as insecticides, parasiticides, fungicides and for other purposes, which can be made in commercial quantities. This application is a continuation-in-part of my co-pending application Serial No. 582,657, filed May 4, 1956.

In accordance with the present invention, I have discovered a new and useful generic class of 1-aminonicotinium salts corresponding to the general formula:

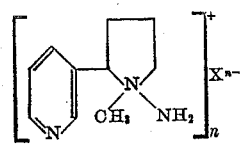

In the above formula, X may be the anion of an inorganic acid. Suitable anions are chloride, bromide, iodide, sulfate, bisulfate, nitrate, phosphate, acid phosphate, diacid phosphate, etc. The chloride is most conveniently prepared by bubbling chloramine into a solution of nicotine in an inert solvent such as chloroform. The bisulfate is best prepared by the reaction of hydroxylamine-o-sulfonic acid and nicotine in a hydroxylic solvent such as methyl alcohol. Introduction of the other anions of this invention is by metathesis. While several basic metathetical approaches are available, the method selected depends on experimental convenience, cost of reagents and the differences in physical properties between the product and the starting material to be utilized. Reaction of 1-aminonicotinium chloride with a soluble silver salt, such as silver nitrate, results in the precipitation of silver chloride and the formation of 1-aminonicotinium nitrate. In an analogous fashion, treatment of the sulfate with a barium salt results in the precipitation of barium sulfate and conversion to the anion of the barium salt. Going from a more soluble 1-aminonicotinium salt to a less soluble one is best accomplished by treating the former with a solution containing an excess of the anion being introduced. Another technique, which is independent of the formation of an insoluble solid, is to react the chloride with an excess of the desired anion as its acid; hydrogen chloride is evolved as the new salt is formed.

The salts of my novel 1-aminonicotinium compounds are useful as improved insecticides, parasiticides, and fungicides. My compounds are useful where nicotine is useful but are superior to and more convenient to use than nicotine itself because they are less toxic to warm-blooded animals by inhalation or absorption through the skin. The increased stability of my novel compounds over nicotine is extended to salts of nicotine. For example, 1-aminonicotinium compounds are stable to alkali and resist oxidation as evidenced by their failure to discolor and turn brown in air.

The scope and utility of the present invention is further illustrated by the following examples.

Example I

Hydroxylamine-o-sulfonic acid was made according to the directions of Sommer, Schulz and Nassau, Z. Anorg. u. Allgem. Chem., 147, 142 (1925). Titration with acidified potassium iodide solution showed it to contain up to 97% active material. A methyl alcohol solution containing 26 g. of hydroxylamine-o-sulfonic acid was added gradually to 16 g. of nicotine in 50 ml. of methanol saturated with solid sodium hydroxide; a vigorous reaction resulted. After refluxing four hours, the reaction mixture was filtered hot and the precipitate washed with additional solvent till free of strong reducing agent. The residue obtained from the evaporation of the combined filtrate and washings was dissolved in water, made alkaline with sodium bicarbonate and extracted with ether. The aqueous layer was evaporated to dryness, the resultant residue taken up in methyl alcohol and the purification repeated. The product, 1-aminonicotinium sulfate, was a tan semi-solid residue soluble in water, methyl alcohol isopropyl alcohol and insoluble in chloroform and benzene. Unlike nicotine its picrate was an oil. An aqueous solution of the product had a neutral reaction, gave orange crystals with potassium hexafluophosphate and a crystalline chloroplatinate (M.P. 248–250° C. after recrystallization from water) with chloroplatinic acid.

Example II

Ten ml. of water containing 0.5 g. of the product of Example I and 0.5 g. of ammonium silicate was evaporated to dryness on the steam bath and kept there for three additional hours. A solution of 1 ml. of concentrated hydrochloric acid and 2 ml. of water was added with stirring and the system again evaporated. The resultant 1-aminonicotinium polysilicate on silica was washed with water and vacuum dried. The product was an off-white powder that darkened ca. 150° C. but did not melt.

Example III

Using the chloramine generator described in U.S. Patent 2,710,248, 50 g. of nicotine in one liter of chloroform was treated with a 100% excess of chloramine. After standing overnight, the reaction mixture was filtered from about 25 g. of ammonium chloride and evaporated to give a dark brown viscous material. The residue was taken up in isopropyl alcohol, filtered and the solvent evaporated leaving the semi-solid alcoholate which was dissolved in water and made alkaline to phenolphthalein by the addition of sodium carbonate. The aqueous solution was treated with charcoal, filtered, extracted twice with equal volumes of ether, extracted once with an equal volume of benzene and evaporated in vacuo to give back 1-aminonicotinium chloride · isopropyl alcohol (calculated for chloride 12.85% found on titration, 12.63%). Heating to 75–80° C. drove off the alcohol leaving the non-crystalline, light brown 1-aminonicotinium chloride which started decomposing ca. 150° C.

Example IV

A 50 mg. portion of the brown alcoholate of Example III was dissolved in water, treated with charcoal, filtered and poured into a ten volume excess of dioxane. After the resultant solid had settled, the solvent was decanted and the solid washed by decantation with two 5 ml. portions of dioxane and washed free of dioxane by trituration with ether. The addition of 50 mg. of sulfuric acid in 5 ml. of isopropyl alcohol resulted in the formation of a slightly yellow gum. Extraction of this gum with methyl alcohol gave two products, one solvent soluble and a trace of insoluble material as the other. Evaporation of the alcohol gave the major product, 1-aminonicotinium sulfate, as a yellowish gum soluble in water and methyl alcohol but insoluble in isopropyl alcohol. It decomposed ca. 145–148° C., gave an immediate precipitate with barium ion but was not converted to nicotine on treatment with strong aqueous sodium hydroxide.

Example V

A 100 mg. portion of the alcoholate of Example III was purified as described in the previous example. A solution of 300 mg. of phosphoric acid in 10 ml. of ether was added with stirring to the previously ether-washed residue. On standing, the yellow residue changed to a white solid. The product was soluble in water and methanol, insoluble in isopropyl alcohol and dioxane, and decomposed with darkening and gas evolution above 200° C. Since its aqueous solutions were acidic, the product has been assigned the diacid phosphate structure.

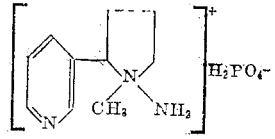

Example VI

Using the chloramine generator described in U.S. Patent 2,710,248, 42 g. of nicotine (no solvent) in a bubbler tube was treated with half the theoretical amount of chloramine. The reaction mixture, kept at 0–5° C., set up to a honey-combed off-white solid showing very little obvious brown liquid. Trituration of the reaction mixture with benzene gave 1-aminonicotinium chloride, as an off-white solid, so hygroscopic that it immediately turned to a yellow gel in air. Using this material in place of the product of Example III (the alcoholate) in the procedure of Example IV gave the same yellow gummy mixture.

Example VII

A small sample of 1-aminonicotinium chloride, as prepared in the previous example, was treated with alcoholic silver nitrate. The reaction mixture was filtered from the resultant silver chloride and evaporated in vacuo. The resultant 1-aminonicotinium nitrate was a thick, heat unstable oil.

I claim:

1. New chemical compounds having the general formula:

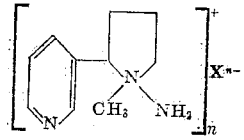

wherein X is the anion of an inorganic acid.

2. 1-amino-1-methyl-2-(3-pyridyl)pyrrolidinium chloride.

3. 1-amino-1-methyl-2-(3-pyridyl)pyrrolidinium sulfate.

4. 1-amino-1-methyl-2-(3-pyridyl)pyrrolidinium nitrate.

5. 1-amino-1-methyl-2-(3-pyridyl)pyrrolidinium phosphate.

6. 1-amino-1-methyl-2-(3-pyridyl)pyrrolidinium polysilicate.

No references cited.